May 29, 1945. H. W. ADAMS ET AL 2,377,199
TRANSMISSION
Filed Feb. 25, 1943
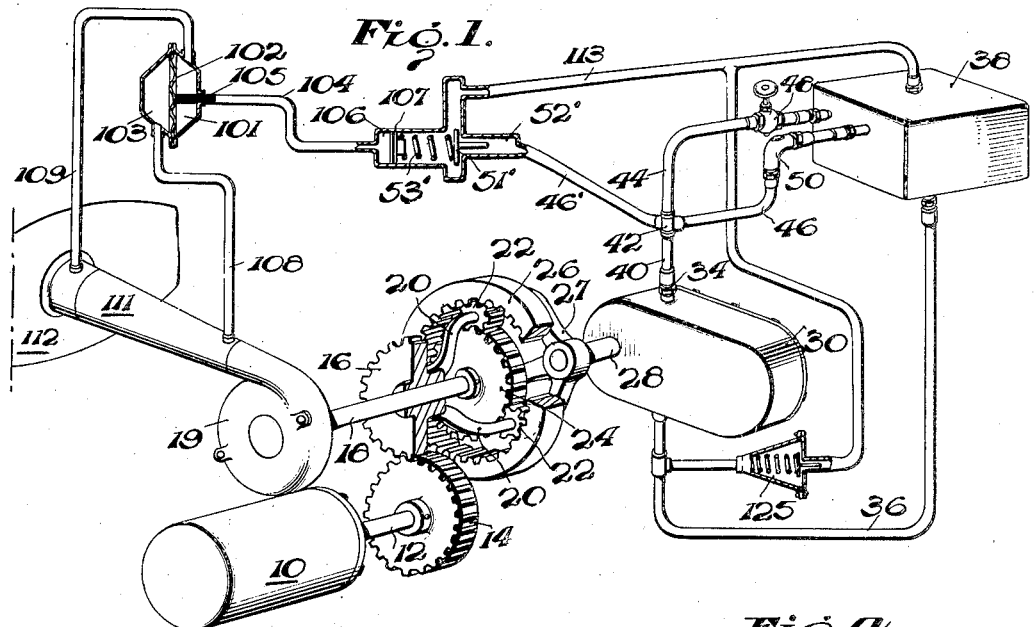
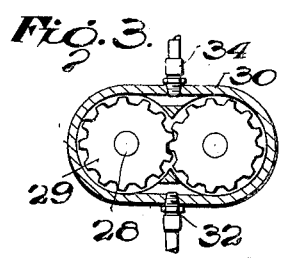
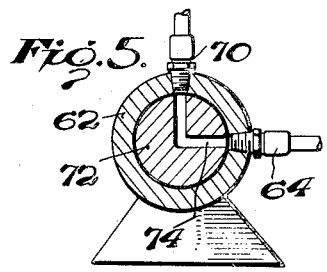
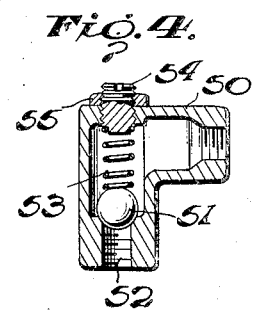
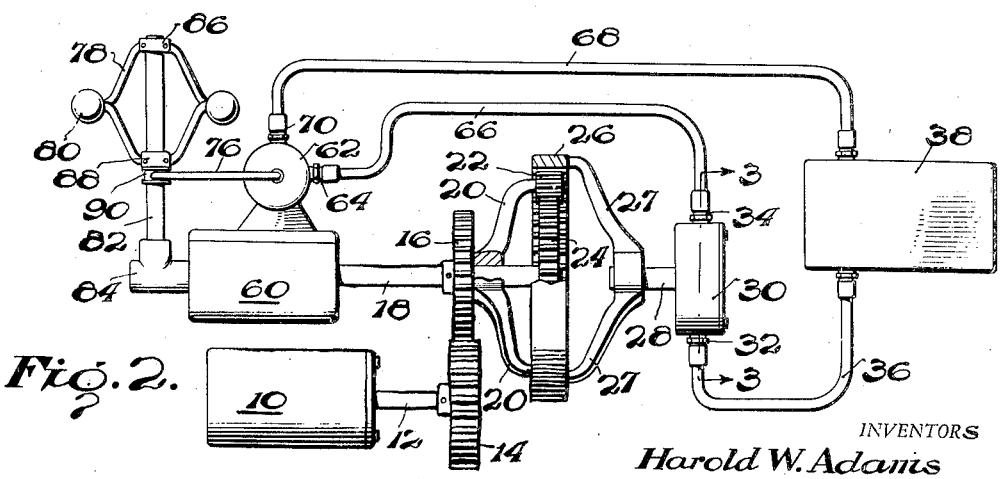
INVENTORS
Harold W. Adams
Wolfgang B. Klemperer
By Martin J. Finnegan ATTORNEY Patented May 29, 1945

2,377,199

UNITED STATES PATENT OFFICE 2,377,199

TRANSMISSION

Harold W. Adams, Santa Monica, and Wolfgang B. Klemperer, Los Angeles, Calif., assignors to Bendix Aviation Corporation, Bendix, N. J., a corporation of Delaware Application February 25, 1943, Serial No. 477,148

4 Claims. (Cl. 230—11)

This invention relates to a transmission drive, particularly of the hydraulically controlled type, which is adapted to transmit power from a prime mover to a driven unit.

Many such transmissions are known to the art but the device of our invention, in addition to being an efficient transmission, is capable of automatically limiting the torque of a driven unit or, in combination with a governor, is capable of maintaining the speed of the driven unit constant.

Furthermore, our transmission is especially adaptable for use where it is desired to selectively transmit power from a single prime mover to a plurality of driven units of varied importance. When such a requirement is present, it has been a difficult problem to relieve the prime mover of the burden of driving the least important unit when, for instance, the most important unit requires all the available power.

The difficulty becomes even greater when weight and space considerations are important, as in aircraft. A particular example may be given with respect to an aircraft engine section. Such engine sections, as a general rule, are extremely crowded with accessories, oil tanks, electrical conduits, etc. Add to those a supercharging blower such as is necessary in high altitude airplanes to increase the cabin pressure while flying at heights at which the atmospheric pressures are lower than those compatible with physiological comfort and the situation tends to become critical, practically obviating the addition of any further apparatus of appreciable bulk. However, it is in just such an instance that our transmission is needed, as will be explained.

Naturally, in the above example, if the supercharging blower were connected to the engine crankshaft by direct drive, no bulky apparatus or transmission would be required. The blower would be operating at all times the engine was running and, if it was not desired to increase the cabin pressure, the blower air could merely be by-passed. This condition, however, brings us to one of the needs for a transmission. Supercharging blowers require a certain amount of the available engine power for their operation. If the blowers are directly connected to the engine at all times, the power required to operate them is being taken from the engine at all times and for no good reason. The blower output is merely being by-passed because it is not necessary to increase the cabin pressure until high altitudes are reached. Of greater consequence, however, is the fact that during certain flying conditions, particularly at takeoff, it is extremely important and desirable that all available engine power be transmitted to the propellers. It is for this reason that engine manufacturers rate their engines at two different powers; namely, normal rated power and takeoff power, the latter being the maximum output of the engine to be used only at takeoff or in emergency for periods of short duration. It is obvious then that to waste any of this power is highly undesirable.

Another function of our invention is to prevent excessive damage to the blower during operation thereof. Supercharging blowers, as used in aircraft, are expensive mechanisms. If a direct drive between the engine and blower is being used and anything occurs to jam the blower, the result is obvious. The blower shaft may be snapped or more serious damage may be done if the blower continues to run improperly. It is therefore desirable to provide a device for limiting the torque to which the blower can be subjected and this is an accomplishment of our transmission in that it automatically declutches the blower from the engine drive when the torque forces in the blower approach a dangerous value.

As previously mentioned, our transmission also readily lends itself for use as a constant speed control in connection with a governor. In such an instance a governor is provided on the driven unit and is connected to the transmission control so that any tendency toward variation in speed of the driven unit will react on the governor and, in turn, on the transmission control causing the transmission to declutch or partially declutch and slip to maintain the constant speed desired.

In view of the above, it is therefore an object of our invention to provide a relatively non-complicated, controllable, hydraulic transmission, light in weight and of small size which includes a clutching and declutching device selectively operable in accordance with varying power requirements.

Another object is to provide a mechanism for transmitting power from a prime mover to a driven unit in a manner such that the torque forces in the driven unit are limited.

Another object is to provide a transmission which is readily adaptable for use in combination with a governor to maintain the speed of a driven unit constant.

Still further objects are: To provide a transmission having a clutching device which is operable in response to pressures within the device; to provide a transmission which is responsive to torque forces; and to provide a transmission which is readily adapted to vary its operation in response to a speed governing control.

Other objects and advantages of this invention will become apparent as the description proceeds.

In the drawing:

Fig. 1 is a perspective view of our transmission including a prime mover and a driven unit and showing an adjustable pressure operated valve for automatic control and a two-way valve for manual control.

Fig. 2 is a view in elevation of an arrangement similar to Fig. 1 wherein the driven unit is one which requires constant speed control, and a governor is utilized to operate the transmission control valve.

Fig. 3 is a sectional view taken on the line 3—3 of Fig. 2 of a conventional gear pump which is adapted to control the transmission in accordance with the valve settings; and Fig. 4 is a sectional view of the conventional type adjustable relief valve which we use to automatically control the gear pump and thus vary the maximum torque forces in the driven unit.

Fig. 5 is a sectional view of a conventional valve which is used to manually control the gear pump.

In Fig. 1, the numeral 10 indicates a prime mover having a drive shaft 12 upon which is mounted a driving gear 14. The driving gear is adapted to mesh with another gear 16 which is freely and rotatably mounted on a shaft 18 of a driven unit 19, shown in the form of a supercharging blower. Fixed to the gear 16 is a three-armed spider 20, each arm of which forms an axis for mounting a planetary gear 22. The three planetary gears are adapted to mesh with a sun gear 24 which is fixed to the shaft 18.

Thus far in the description it may be seen that rotation of the prime mover in a clockwise direction will cause the driving gear 14 to rotate the gear 16 and consequently the spider 20 in a counter-clockwise direction. This rotation will in turn cause the planetary gears to rotate in a counter-clockwise direction as they travel in mesh with and around the sun gear 24. This is all the movement that will take place, the sun gear and the shaft 18 to which it is fixed remaining stationary. However, in order to cause the planetary gears to drive the sun gear, a ring gear 26 is provided to encircle the three planetary gears and mesh therewith. The ring gear is fixedly mounted by means of a spider 27 to a shaft 28, which shaft is connected to one of the gears 29 of a gear pump 30, forming the axle thereof.

The gear pump 30 has an inlet fitting 32 and an outlet fitting 34. Fitting 32 is connected by a pipe 36 to a fluid supply reservoir 38 and the pump, when operating, is adapted to draw fluid from the reservoir through the pipe 36. Fitting 34 is connected by a pipe 40 to a T 42. From the T, two pipes 44, 46 extend into the reservoir 38. Pipe 44 incorporates a conventional manually controlled valve 48, and pipe 46 incorporates an adjustable spring loaded pressure relief valve 50. The valve 50 is of the ball type, a ball 51 closing the inlet port 52 and being urged to the closed position by a spring 53. The pressure at which the ball may be unseated to open the valve is controlled by an adjustable screw plug 54 bearing on the spring at the opposite end from the ball. This screw plug changes the compression forces of the spring and, when the desired compression force is obtained the screw plug may be locked by means of a jam nut 55.

A complete system for transmitting power from a prime mover to a driven unit has now been described together with apparatus for clutching and declutching the driving force and limiting the torque of the driven unit 19. The operation of this system is as follows: The prime mover 10, which may be an internal combustion engine, electric motor, or otherwise, drives the shaft 12 and the gear 14, fixed thereto, in a clockwise direction causing the gear 16, with which gear 14 is in mesh, to be driven in a counter-clockwise direction. Consequently, the spider 20 fixed to gear 16 is rotated in the same direction, forcing the planetary gears 22 which are in mesh with both the sun gear 24 and the ring gear 26, to move. At this stage it may be seen that either the ring gear or sun gear will be driven by the planetary gears depending upon which is more easily movable. If the ring gear is held stationary, the sun gear will be driven thus driving the supercharging blower 19 through the shaft 18, in which case the ring gear will act merely as a stationary track for the planetary gears. On the other hand, if the ring gear is allowed to rotate freely, it will be driven by the planetary gears and the sun gear will remain stationary, acting as a track, for the reason that the sun gear is required to drive the unit 19 and therefore greater force is needed to rotate same than to drive the freely rotatable ring gear. In other words, the drag on the driven unit effectively serves as a brake with respect to the ring gear. This is the basic operating principle of our transmission and it may be seen that the control thereof is entirely accomplished by the ring gear. The ring gear is in turn controlled by the gear pump 30 in that the gear will be free to rotate only so long as the gear pump is permitted to pump. If the outlet or pressure pipe is closed by the manually operated valve 48, the pump will be stopped by the built up pressure, thus halting the ring gear rotation. Therefore, manual control of the transmission is easily accomplished. If, however, the pressure in the pump builds up sufficiently to unseat the ball valve 50, the pressure will be released thereby and the pump and ring gear will again be free to rotate until the pressure decreases to a value below that at which the ball valve is unseated. This brings us to the torque limiting feature of the invention.

The torque limiting feature of the invention is concerned with the setting of the relief valve 50 with respect to the maximum torque value to which it is desired that the driven unit 19 be subjected. In other words, the pressure at which the valve 50 will relieve can be coordinated with the maximum design torque of the driven unit. Turning back now to the operation of our transmission drive, it was explained that as the planetary gears revolved, they would drive either the driven unit 19 through the sun gear 24 or the gear pump 30 through the ring gear 26, depending upon which required the lesser driving force, in which case the gear requiring the greater driving force serves as a track for the planetary gears and remains approximately stationary. Keeping this function in mind, let us assume then that the ring gear is being held stationary by reason of the outlet valves 48 and 50 being closed and that therefore the driven unit is being rotated because it requires the lesser driving force. Now, let us assume further that something occurs to jam the driven unit and prevent its rotation at least in part. Immediately the torque force or necessary driving force increases and the planetary gears strive the harder to drive the unit. This in turn puts a greater load upon the ring gear acting as the track, and on the pump to which the ring gear is rigidly connected. The pump exerts more pressure on the trapped fluid in the outlet line and the increased pressure unseats the ball valve 50. As soon as the pressure is released, the pump and the ring gear will become relatively free and will therefore require a lesser driving force than the jammed driven unit. The driving force will accordingly be transmitted to the ring gear and the load on the driven unit will be relieved. It may readily be seen then that if the valve 50 is set to relieve at a pressure consistent with a desirable maximum torque force in the driven unit, the forces in the unit will never be able to exceed that maximum because the valve 50 will relieve, thus allowing the ring gear to slip and lessen or halt the effect of the driving force on the driven unit.

The system of Fig. 1 includes additional means for automatically controlling the rotational resistance of pump 30. This additional means includes a relief valve 51', located in a chamber 52' at the terminus of a conduit 46' which in turn leads from pump outlet conduit 40; also an automatic regulator having two chambers 101 and 103 separated by a diaphragm 102 to which is physically attached the end of a piston 105 having a tight sliding fit within a conduit 104 leading to a chamber 106 containing a piston 107 abutting a spring 53' whose other end abuts the relief valve 51' and constantly urges said relief valve to the closed position. Conduits 108 and 109 connect the chambers 101 and 103, respectively, with the throat and mouth, respectively, of venturi 111, the latter being part of the conduit from supercharger 19 to the plane's cabin 112. A conduit 113 leads back to reservoir 38, and conducts fluid from chamber 52' when relief valve 51' opens. Conduit 104 is initially filled with a suitable liquid and remains filled at all times, as such liquid has no means of escape— the piston 107 being in liquid tight, although slidable, engagement with cylinder 106.

In operation, when it is desired to rely entirely upon the automatic regulation afforded by the parts just described, the operator will close valve 48 and will also adjust nut 54 so as to assure maintenance of ball valve 51 in the closed position. With both these valves 48 and 51 closed off for the duration of the operation, the only outlet for pump 30 will be the automatically controlled outlet valve 51'. Moreover, this automatically controlled outlet valve 51' will not only operate to limit the torque applicable to supercharger 19; it will also operate to assure a constant flow of supercharging air to cabin 112, and this constant flow will be maintained regardless of existing cabin pressure and without in any way throttling the flowing air itself; the constancy of the flow being due, of course, to the action of the flow upon diaphragm 102 and hence upon the piston 107 to which the diaphragm 102 transmits its motion, through the agency of the intervening liquid in conduit 104.

As has been previously stated our transmission may be readily adapted to drive a constant speed unit such as an alternator or similar device. Such an adaptation is shown in Fig. 2, the numeral 60 indicating the unit which is to be driven at a constant speed. It may be seen that the gearing between the prime mover 10 and the sun and ring gears 24, 26, respectively, is identical with that described above, as is also the connection between the ring gear and the gear pump 30. In other words, the only difference in this system is in the control of the pump outlet valve.

This valve, indicated by the numeral 62, is shown in detail in Fig. 5 and has an inlet port 64, connected to the outlet port 34 of the gear pump 30 by a pipe 66. Another pipe 68 connects the outlet port 70 of the valve to the fluid reservoir 38. The valve plug 72 has a right-angled passage 74 therethrough adapted to connect the valve ports 64 and 70 when the valve is in the "open" position. The position of the valve plug 72 is controlled by a lever 76 and the arrangement is such that a relatively small lever movement will completely open or close the valve.

The lever 76, as it is shown in Fig. 2, is in the valve closed position and the end of the lever is forked and is connected to a governor 78. The governor shown is conventional, having a ball and a linkage arrangement 80 mounted for rotation upon a shaft 82. The lower end of the shaft is geared to the drive shaft 18 of the constant speed unit 60 in a gear box 84 in a manner such that the governor shaft 82 is driven directly from the drive shaft 18. The top portion of the governor linkage is fixed to the shaft 82 at 86 so as to be rotated thereby, while the lower portion of the linkage is attached to a collar 88 loosely mounted on the shaft so that it may reciprocate thereon as the centrifugal force changes the position of the ball and linkage arrangement 80. The collar 88 has a subtending portion 90 which is grooved in the manner of a pulley and in this groove the forked end of the valve lever is adapted to ride.

The governor and valve lever are set so that the valve will be in the closed position when the driven unit is operating at the desired speed. In this way, any tendency of the prime mover 10 to drive the unit 60 at a speed in excess of the desired speed will react on the governor, forcing the balls outward and pulling the valve lever upward into the valve open position. As the valve opens, the gear pump 30 will be permitted to turn as will the ring gear, consequently creating a power slippage and damping out the speed increase tendency. When the speed increase tendency has been dissipated, the governor will return to its normal position as shown in Fig. 2 and close the valve, thus halting the pump and the ring gear.

While we have herein shown and described our invention in its present preferred embodiments, it will be apparent to those skilled in the art, that various modifications and changes may be made therein without departing from the spirit or scope thereof. We aim in the appended claims to cover such modifications and changes.

This application is a substitute, in part, for our application Serial No. 308,560, filed December 11, 1939.

Reverting to Fig. 1, there is also shown a low pressure by-pass circuit including a valve 125 operative to increase the fluid availability during relatively high speed rotation of pump 30. Opening of valve 125 will occur on such occasions, and the resulting direct return of the fluid to the pump feed line 36 (without first going back to reservoir 38) will tend to reduce pump torque and "cavitation" (particularly if valve 125 is installed close to, or integral with, the pump itself)

and thus make possible a lower supercharger speed for any given rate of air flow.

What is claimed is:

1. In combination, driving means having a variable operating speed range, supercharger means having a definite predetermined operating value, connecting means effective for establishing a positive driving relationship between said driving means and said supercharger to coordinate said value and range, hydraulic means for rendering said connecting means effective, resilient means for controlling said hydraulic means, fluid flow responsive means operated by said supercharger and including a diaphragm, a fluid connection between said diaphragm and said resilient means and responsive to said diaphragm to render said hydraulic means effective for modifying said relationship to insure retention of said value within said range.

2. The structure of claim 1 as set forth and defined therein including, manually operated means connected to said hydraulic means for rendering the latter effective when said resilient means is ineffective.

3. The structure of claim 1 as set forth and defined therein including, manually operated means connected to said hydraulic means for rendering the latter effective when said resilient means is ineffective, and manually adjustable means effective for establishing an operating value when said resilient means is ineffective and said manually operated means is effective.

4. In a power plant for an aircraft, the combination with an internal combustion engine and an aircraft cabin to be supercharged; of a hydraulic pump, a supercharger, a planetary gear train connecting said supercharger and pump to said engine in such a manner as to provide a slippage means for varying supercharger speed; the said slippage means including the hydraulic pump driven by the planetary gears, a supply tank furnishing a liquid medium to said hydraulic pump, and said hydraulic pump discharging the said fluid medium back to the supply tank, a relief valve controlling the flow of the discharge fluid from said pump, spring means for biasing said valve into a closed position; and means for controlling the tension of said spring means including, an airflow venturi leading from said supercharger into said cabin and a flow regulator responsive to the pressure across said venturi and arranged to regulate the tension of said spring means in accordance with said pressure, whereby there is provided a substantially constant flow of air from said supercharger into said cabin, and a by-pass leading from the outlet side of said relief valve to the inlet side of the pump for increasing the fluid medium available at high pump speeds.

HAROLD W. ADAMS.
WOLFGANG B. KLEMPERER.